May 6, 1947.  H. J. RATHBUN  2,420,192
INDUCTION MOTOR CONTROL SYSTEM
Filed June 14, 1943  2 Sheets-Sheet 1

INVENTOR.
Harold J. Rathbun
BY John N. Leonard
his ATTORNEY

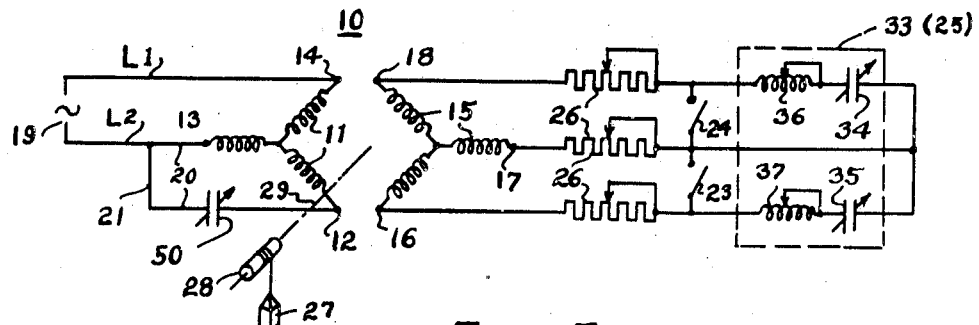
Fig.-7
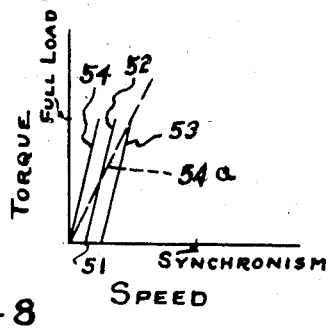
Fig.-8
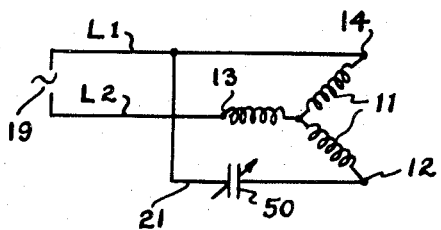
Fig.-9
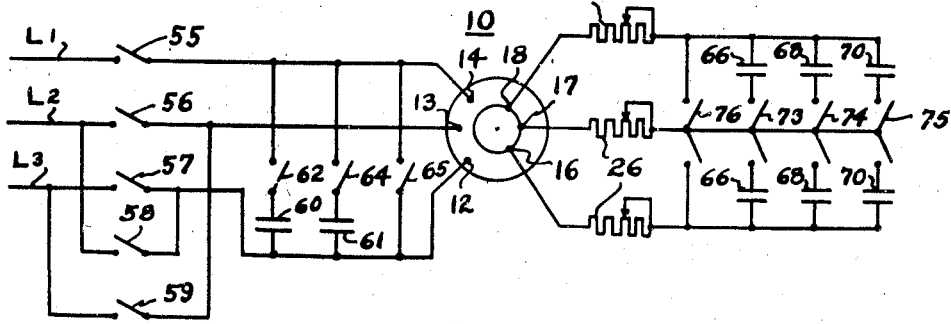
Fig.-10
| | SWITCHES | | | | | | | | | |
|---|---|---|---|---|---|---|---|---|---|---|
| LOWERING POSITIONS | 55 | 56 | 57 | 65 | 73 | 62 | 74 | 64 | 75 | 76 |
| 1 | • | • | | • | • | | | | | |
| 2 | | • | • | | | • | • | | | |
| 3 | • | | • | | | | | • | • | |
| 4 | • | • | • | | | | | | | • |
Fig.-11

Patented May 6, 1947

2,420,192

UNITED STATES PATENT OFFICE 2,420,192

INDUCTION MOTOR CONTROL SYSTEM

Harold J. Rathbun, Cleveland, Ohio, assignor to The Electric Controller & Manufacturing Company, Cleveland, Ohio, a corporation of Ohio Application June 14, 1943, Serial No. 490,729

14 Claims. (Cl. 172—274)

This invention relates to electrical braking circuits for alternating current motors and to motor control systems incorporating such electrical braking circuits.

It is known that if a single phase or polyphase induction motor having an inductive secondary circuit of relatively high resistance has a portion or all of its primary winding excited from a source of electrical power having preponderantly single phase characteristics while a portion of its primary winding is connected in a closed local circuit of relatively low impedance, an effective braking torque is produced by the motor at predetermined speeds in either direction of rotation. If the voltage applied to the primary winding has no quadrature component capable of producing an effective motor torque at standstill, the retarding torque of the motor when connected in this manner is zero at standstill and increases with the speed until speeds greatly in excess of the synchronous speed of the motor are reached, the maximum retarding torque at synchronous speed being obtained when the resistance of the secondary circuit is equal to the reactance of the secondary circuit measured at twice the frequency of the primary excitation. When the secondary circuit includes only resistance and inductive reactance, the maximum retarding torque obtainable with this type of braking connection at synchronous speed in the case of a three-phase motor is substantially equal to one-third of the normal pull-out torque of the motor.

The use of alternating current dynamic braking circuits of the type just described has been limited due to excessive primary and secondary motor currents which flow during braking operations, insufficient braking torque at the desired speeds, low power factor, and poor speed regulation when employed to control the speed of overhauling loads.

If a torque producing voltage component is provided in the primary excitation of a motor connected as above described or in other similar known alternating current dynamic braking circuits, an effective motor torque exists at standstill. This effective starting torque has been obtained previously by connecting the primary winding for energization with unbalanced polyphase voltages which produce an elliptical field, i. e. a field which may be considered as two oppositely rotating fields of unequal magnitude. The effective retarding torque is increased if the starting torque is a reverse torque, i. e. is in the same direction as the retarding torque, but has heretofore been greatly decreased at all speeds if the starting torque is a forward torque, i. e. is in a direction opposite to the retarding torque. In many applications of motors arranged to be connected for alternating current dynamic braking, it is undesirable to have an effective starting torque when the braking circuit is completed unless the starting torque assists the torque of an overhauling load which is to be braked at higher speeds. Consequently, prior attempts to increase the braking torque by providing a reverse starting torque have not resulted in braking control systems of universal application.

It is an object of this invention to provide improved alternating current motor control circuits.

Another object is to provide an alternating current dynamic braking circuit for induction motors which overcomes all of the aforementioned disadvantages of prior circuits.

Another object is to provide an alternating current dynamic braking circuit for an alternating current motor driven by an overhauling load which permits the motor to operate with improved speed regulation.

Further objects are to provide alternating current dynamic braking circuits for an alternating current motor which cause the motor (1) to exert increased braking torques at speeds below synchronism without producing an effective reverse starting torque; (2) to consume a reduced amount of power during braking operations; (3) to produce an effective forward motor torque at standstill and yet produce increased braking torques at higher speeds; and (4) to operate with improved speed regulation throughout the usual overhauling torque ranges.

Additional objects of this invention are to provide an induction motor control system in which (1) the motor operates to oppose the torque of large overhauling loads although the motor power consumption is below its full load value; (2) the motor current decreases as the speed increases; (3) increased braking torques are produced at slow speeds with no tendency for the motor to reverse; (4) and improved means are provided to produce an effective starting torque in either direction of rotation while the braking circuits are completed.

A further object is to provide a tuneable resonant secondary circuit in a control system for an induction motor.

Another object is to provide means for reducing the torque producing ability of the secondary currents within the lower range of frequency in an induction motor having its primary winding excited to produce in the motor the phenomenon considered as two oppositely rotating magnetic fields.

Another object is to provide means for increasing the torque producing ability of the secondary currents within the higher range of frequency in an induction motor having its primary winding excited to produce in the motor the phenomenon considered as two oppositely rotating magnetic fields.

A further object is to provide a control system for a polyphase induction motor which system includes means for introducing capacitive reactance into either the primary or secondary circuits or both.

A further object is to provide a control system for a polyphase induction motor which system includes means for connecting a phase shifting network into the secondary circuit of the motor.

In accordance with this invention a tuneable electrical network including the secondary winding or arranged to cooperate with the secondary winding of either a single phase or polyphase alternating current motor forms a balanced or unbalanced secondary circuit all or part of which is capable of resonating at one or more selected frequencies. The action of the tuned network causes a manifold increase in alternating current dynamic braking torque over that heretofore obtainable, and does so while the motor is drawing currents of reduced value from the source of supply. To provide an effective starting torque while the motor is connected for alternating current dynamic braking, capacitive reactance is introduced into the local closed circuit of the primary braking connections, and, even when the starting torque is in a direction to assist in driving the load at standstill, the retarding torque produced by the motor at higher speeds is greater than that obtainable by prior alternating current dynamic braking circuits which do not permit motor reversal at low torque.

Other objects and advantages will become apparent from the following description wherein reference is made to the drawing, in which Fig. 1 is a wiring diagram illustrating the braking connections;

Fig. 7 is a wiring diagram of a modified braking connection by means of which an effective starting torque is produced;

Fig. 8 is a graph showing speed-torque characteristics obtainable by means of the circuit of Fig. 7;

Fig. 9 is a partial modification of Fig. 7;

Fig. 10 is a wiring diagram of a complete motor controller incorporating the new braking circuit, and Fig. 11 is a switch sequence chart for Fig. 10.

Figure 1:
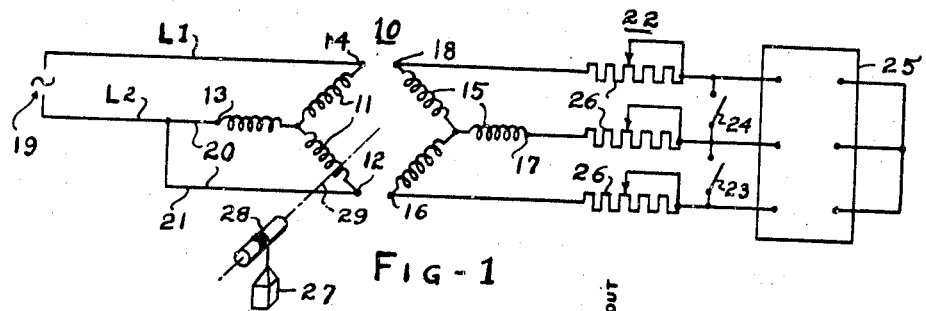

Referring first to Fig. 1, a polyphase induction motor 10 has a primary winding 11 having three non-neutral terminals 12, 13 and 14 and a secondary winding 15 having three non-neutral terminals 16, 17 and 18. For braking operation of the motor 10, the primary winding 11 may be energized from a source of power having preponderantly single phase characteristics, and, as shown, the terminals 13 and 14 are connected to conductors $L_2$ and $L_1$, respectively, which may be the output terminals of a single phase power source (not shown). A local closed circuit 20 of low impedance including a portion of the primary winding 11 is provided by a conductor 21 extending from the primary terminal 12 to the conductor $L_2$. With its primary winding 11 thus connected, there exists in the air gap of the motor 10 the phenomenon considered as two equal magnetic fields rotating at the same speed in opposite directions, the speed of rotation of each field being the synchronous speed of the motor 10 as determined by the number of poles for which it is wound and the frequency of the source 19 and the magnitude of each field being substantially constant and independent of the motor speed.

The secondary terminals 16, 17 and 18 (generally slip rings if the secondary winding is considered to be the rotating winding) are connected respectively to complementary terminals of a polyphase network 22 which includes a pair of short circuiting switches 23 and 24, a tuneable network represented generally at 25, and the usual adjustable resistance elements 26. When the switches 23 and 24 are closed, the secondary terminals 16, 17 and 18 are connected together through a circuit including the resistance elements 26 and, when the switches 23 and 24 are open, the secondary terminals 16, 17 and 18 are connected together through a circuit including the network 25 and the resistance elements 26.

Figure 2:
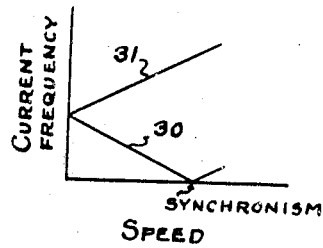
Fig. 2 is a graph showing variations in the secondary currents normally flowing when a motor is connected in a known alternating current dynamic braking circuit.

With the switches 23 and 24 closed and the motor 10 at standstill, there may be considered to be two oppositely rotating magnetic fields of equal magnitude in the air gap, each causing currents having a frequency equal to that of the source 19 to flow in the secondary winding 15. When the motor 10 is caused to rotate by any means, for example by means of an overhauling load 27 suspended from a drum 28 drivingly connected to the motor 10 by a shaft 29, the currents induced in the secondary winding 15 due to the field rotating in the direction of motor rotation, hereinafter the positive sequence currents, decrease from their values at standstill both in magnitude and frequency as the motor speed increases toward synchronism as indicated by the curve 30 of Fig. 2, wherein both frequency and current magnitude are plotted against speed. Concurrently, the currents induced in the secondary circuit due to the field rotating in a direction opposite to the direction of motor rotation, hereinafter the negative sequence currents, increase from their values at standstill both in magnitude and frequency as the motor speed increases as indicated by the curve 31 of Fig. 2. At synchronous speed both the frequency and magnitude of the positive sequence currents are zero and both the magnitude and frequency of the negative sequence currents are at twice their standstill values. Above synchronous speed the magnitude and frequency of both groups of currents increase directly with the speed. The graph of Fig. 2 is for a motor connected so that the two fields are equal in magnitude. If the two fields are not equal, similar variations in frequency and magnitude occur, but the magnitudes of the two sequence currents are not equal at standstill. A primary winding of an alternating current motor connected for braking purposes and so as to produce currents of two different frequency ranges in the secondary circuit upon rotation of the motor hereinafter is described as being connected in an alternating current dynamic braking circuit.

The positive sequence currents react with the magnetic field creating them to produce a torque assisting the overhauling load 27, and the negative sequence currents react with the magnetic field creating them to produce a torque opposing the torque of the overhauling load 27. The difference between these two torques is the net retarding or braking torque indicated by the curve 32 of Fig. 3 wherein braking torque is plotted against speed. If the resistance per phase of the closed secondary circuit is equal to the ohmic value of the inductive reactance of the secondary circuit per phase measured at twice the frequency of the source 19, the maximum braking torque obtainable at synchronous speed is substantially one-third of the normal pull-out torque of the motor 10.

Motors connected as just described, i. e. in accordance with Fig. 1 while the switches 23 and 24 are closed, have been used extensively to control the lowering speeds of overhauling loads on various types of crane hoists. However, when so connected, both the primary and secondary currents of the motor are so greatly in excess of full-load values that lowering operations can be continued for but a few seconds, the retarding torque is small at slow speeds so that heavy overhauling loads cannot be lowered at the extremely slow speeds required in many cases, the motor cannot be brought to a stop quickly, and the speed regulation of overhauling loads is poor as evidenced by the gradual slope of the curve 32.

In accordance with this invention the network 25 interposed in the secondary circuit upon opening of the switches 23 and 24 cooperates with the secondary winding 15 and the resistance elements 26 to render the network 22 a tuned network offering relatively high impedance to currents having a frequency below that of the source 19, and relatively low impedance to currents having a frequency above that of the source 19, and thereby effectively reduces the torque producing ability of the positive sequence secondary currents and augments the torque producing ability of the negative sequence secondary currents, thus increasing the braking torque. In reducing the torque producing ability of the positive sequence currents the positive sequence currents are reduced in magnitude at all speeds within the usual operating range. The torque producing ability of the negative sequence currents is increased, since, when all or part of the secondary circuit is properly tuned for frequencies in the range of the negative sequence current frequency, increased negative sequence currents flow which, if the secondary circuit is balanced and near resonance, are substantially in phase with the secondary voltage producing them. If the secondary circuit is unbalanced, the shift in phase of and increase in the negative sequence secondary phase currents is such as to increase the total torque produced thereby. The increased braking torques are produced even though the primary current is reduced below that which flows when the network 25 is omitted. This is because the positive sequence secondary current is reduced and because the power factor angle between the negative sequence secondary voltage and current is decreased. A decrease in this power factor angle increases the torque producing ability of a given magnitude of negative sequence secondary current. Since the network 25 contains capacitive reactance, the primary power factor is also increased at all speeds and thereby contributes to the reduction in the heating of the motor 10 and increases the efficiency of the control system.

The tuneable network 25 is of suitable type having the electrical property of increasing to above normal either the current magnitude or the effective power factor or both in the case of the negative sequence currents and of decreasing the current magnitude or the power factor or both in the case of the positive sequence currents.

Figure 3:
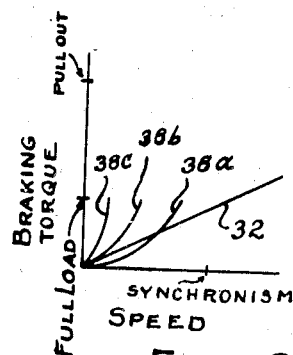
Fig. 3 is a graph showing speed-torque characteristics obtainable by means of this invention.
Figure 4:
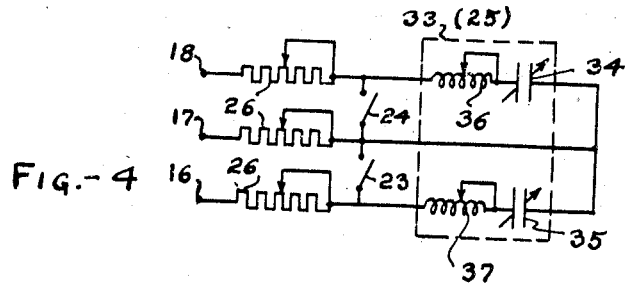
Figs. 4, 5 and 6 are partial wiring diagrams illustrating modifications of Fig. 1.
Figure 5:
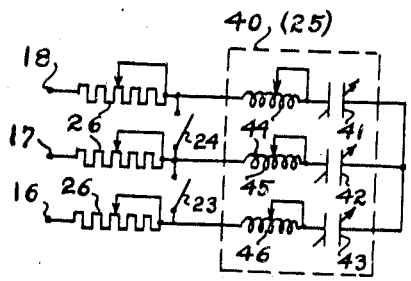
Figure 6:
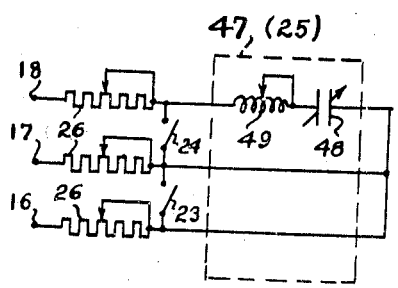

Exemplary circuits for the network 25 are illustrated in Figs. 4, 5 and 6. In Fig. 4 there is shown a suitable tuneable network in the form of a filter circuit indicated at 33 which comprises a pair of variable condensers 34 and 35 each connected in a branch of the secondary circuit of the motor 10 and a pair of variable reactors 36 and 37 connected in series with the condensers 34 and 35, respectively. The reactors 36 and 37 may be omitted, if desired, the secondary windings 15 alone providing the necessary inductive reactance in the secondary circuit. By proper selection of the electrical constants of the condensers 34 and 35 and the reactors 36 and 37, the speed-torque curve 38a of Fig. 3 may be obtained, and by varying the capacity of each of the condensers 34 and 35, the curves 38b and 38c may be obtained. The curves 38a, 38b and 38c are plotted from test data obtained when the capacities of the condensers 34 and 35 are equal to each other. A comparison of the curves 38b and 38c with the curve 32 shows that the braking torque has been greatly increased at slow speeds by insertion of the filter 33 in the secondary circuit. Concurrently with this marked increase in braking torque, both the primary and secondary motor currents are so reduced in value that braking operations can be continued as long as necessary without overheating the motor. The slopes of the curves 38a, 38b, and 38c as compared with the slope of the curve 32 illustrates graphically the great improvement in speed regulation that is obtained by use of a filter in the secondary circuit. The secondary resistance 26 may also be varied to control the amount of braking torque, as in prior alternating current dynamic breaking circuits, increased braking torque being obtained at slow speeds with lower values of resistance than the optimum values used when the switches 23 and 24 are closed.

In Fig. 5 a tuneable network in the form of a filter circuit represented at 40 comprises three variable condensers 41, 42 and 43 each connected in a branch of the secondary circuit in series with three variable reactors 44, 45 and 46, respectively. The secondary circuit of Fig. 5 may be balanced whereas in Fig. 4 the secondary circuit is unbalanced. For applications not requiring strong braking torques at slow speeds it may be desirable to use a network 47 as shown in Fig. 6 which comprises a single variable condenser 48 connected in one branch of the secondary circuit in series with a variable reactor 49 in the same branch. It has been found experimentally that throughout a range of speeds from zero to above synchronous speed, that a network such as 33 gives better results than either of the networks 40 or 47 for comparable total values of capacitive reactance.

As an illustration of the difference in capacitive reactance necessary for obtaining speed-torque curves when using the networks 33 and 40, reference is again made to the curves of Fig. 3. These curves were obtained experimentally by connecting the network 33 (Fig. 4) into the secondary circuit of a 15-horsepower, 220 volt, three phase induction motor having a secondary voltage of 170 and full load secondary current of 42 amperes. The equivalent reactance of this motor is approximately 0.7 ohm and the secondary resistance 0.15 ohm. The speed-torque relationship indicated by each of the curves 38a, 38b, and 38c was obtained by adjusting the resistors 26 to 0.5 ohm and each of the reactors 36 and 37 to 4.0 ohms at primary frequency. The capacity of each of the condensers 34 and 35 for obtaining the curves 38a, 38b, and 38c was 160 mfd., 240 mfd., and 400 mfd., respectively. When using the network 40 (Fig. 5) balanced and with each branch having the same value of resistance and inductive reactance as the two outside branches of the network 33, each of the condensers 41, 42, and 43 had values of 240 mfd., 320 mfd., and 400 mfd. for curves similar to curves 38a, 38b, and 38c, respectively.

When the motor 10 is connected as shown in Figs. 1 and 4 to 6, inclusive, no effective motor torque is produced at standstill if it is assumed that the source 19 has no quadrature voltage component capable of producing an effective starting torque. In the embodiment of Fig. 7 a quadrature voltage component capable of producing an effective motor torque at standstill and low speeds is provided by interposing a condenser 50 in the conductor 21. The secondary circuit of Fig. 7 is the same as that shown in Fig. 4, but may be that of either Figs. 5 and 6 as well. It has been found that more efficient starting action is obtained if the secondary circuit is unbalanced. If the primary connections illustrated in Fig. 7 are such as to give a primary phase sequence tending to create a starting torque in the direction of the torque of the overhauling load 27, the motor 10, without the overhauling load 27 attached, starts to rotate in a downward direction due to the effective starting torque provided by the condenser 50, as indicated by the point 51 on the curve 52 of Fig. 8, this being the stable no load speed reached by the motor with a given value of capacity of the condenser 50 and with sufficient impedance in the secondary circuit provided by the resistors 26 and the filter 33. With an overhauling load attached the speed of the motor 10 varies as indicated by the curve 52, the steepness of the curve indicating that a very stable low lowering speed is obtained for all loads. An increase in the capacity of the condenser 50 causes an increase in starting torque, and, with the same or slightly different values of the electrical constants of the secondary circuit, a speed-torque characteristic such as shown by curve 53 is obtained. The curve 54 indicates the braking operation with the condenser 50 shorted out and the capacity of the condensers 34 and 35 each increased from their respective values giving the curves 52 and 53. If the values of the capacity of the condensers 34 and 35 are not changed from the values used to obtain the curves 52 and 53, shorting of the condenser 50 causes the motor to operate along the curve 54a. A comparison of the curves 54a and 52 shows that with the same type of secondary impedance, increased braking torques are obtainable at higher speeds by the introduction of a condenser in the circuit even though a downward starting torque is produced at standstill.

The curves 52 and 53 are plotted from test data obtained by using a 5 horsepower, 230 volt motor with the network 33 in its secondary circuit and by adjusting the values of the reactors 36 and 37 to zero. For the curve 52 the condenser 50 had a value of 40 mfd. and the condensers 34 and 35 each had a value of 240 mfd. For the curve 53 the capacity of the condenser 50 was increased to 80 mfd. and the values of the condensers 34 and 35 each left at 240 mfd. A speed-torque curve such as 54a is obtained with the same motor by shorting the condenser 50 and not changing the values of the condensers 34 and 35.

By having the conductor 21 in which the condenser 50 is interposed interconnect the primary terminal 12 and the conductor $L_1$, as indicated in Fig. 9, instead of the terminal 12 and the conductor $L_2$, the starting torque of the motor 10 is reversed so as to oppose the torque of the load 27 and the braking torque would be further increased at all speeds.

All or some of the braking circuits described and shown in Figs. 1, 4, 5, 6, 7 and 9 may be combined in various ways to form a complete motor control system depending upon the operating characteristics desired for the particular application. The magnitude of the braking torque obtainable near zero speed renders the braking circuits of this invention suitable for stopping heavy inertia loads of the non-overhauling type with no possibility of motor reversal. Heretofore this could only be accomplished by the use of dynamic braking connections employing direct current.

As one example of a complete motor control system there is illustrated in Fig. 10 a wiring diagram of the power circuits for a three-phase motor controller suitable for use in industrial crane hoisting service. In Fig. 10 conductors $L_1$, $L_2$ and $L_3$ are connected to a source of power (not shown) having preponderantly polyphase characteristics. The switches 55, 56 and 57 are arranged to connect the terminals 14, 13 and 12 of the primary winding of the motor 10 to the conductors $L_1$, $L_2$ and $L_3$, respectively, to cause the motor to operate in a lowering direction, and the switches 58 and 59 are arranged to connect the terminals 13 and 12 to the conductors $L_2$ and $L_3$, respectively, to cause the motor to operate in a hoisting direction when the switch 55 is closed. A pair of condensers 60 and 61 are arranged to be connected selectively across the terminals 12 and 14 by means of switches 62 and 64, respectively, and a switch 65 is arranged to interconnect the terminals 12 and 14 through a circuit having no added impedance element.

The secondary circuit of the motor 10 is shown in Fig. 10 as comprising the adjustable resistors 26, pairs of condensers 66, 68 and 70 and double-pole switches 73, 74, 75 and 76. The branches of the secondary circuit connected to the terminals 16 and 18, respectively, are arranged to be connected selectively to the terminal 17 through the resistors 26 alone by means of the switch 76 or through the resistors 26 and selected pairs of the condensers 66, 68 and 70 by means of the switches 73, 74 and 75, respectively.

The switches shown in Fig. 10 may be operated by any suitable means, but preferably are electromagnetically operated and are controlled from a standard master switch having a plurality of positions of movement. A preferred sequence of operation of the switches involved in lowering operations is given by the chart of Fig. 11, a dot indicating a closed position of the respective switch in the respective master switch position.

Hoisting operations may be of the usual sequence and involve merely the closing of the switches 55, 58, 59 and 76 and adjustment of the resistors 26, the switch 76 being closed to complete the secondary circuit independently of the condensers 66, 68 and 70.

The switches 55 and 56 are closed in each of the first three lowering positions as indicated in Fig. 11 to supply single phase power to the primary motor circuit through the conductors $L_1$ and $L_2$ from a single phase of the source. In the first lowering position the switch 65 is also closed as indicated in Fig. 11 to complete the local circuit from the terminal 12 to the terminal 14, and the switch 73 is also closed to connect the pair of condensers 66 into the secondary circuit. The resistors 26 are preferably so adjusted that with the condensers 66 effective in the secondary circuit the motor 10 operates with a speed-torque characteristic indicated by the curve 54 of Fig. 8. Thus, in the first lowering position, light loads are not forced downwardly, but heavy overhauling loads are lowered at extremely slow speeds.

In moving the master switch to the second lowering position, the switches 65 and 73 open and the switch 62 closes to interconnect the terminals 12 and 14 through the condenser 60, and the switch 74 closes to complete the secondary circuit through the pair of condensers 68. A starting torque is produced due to the action of the condenser 60 so that light loads are forced downwardly at slow speeds, and heavy overhauling loads are lowered at slightly increased speeds. The speed-torque characteristic of the motor 10 with the master switch in the second position is shown by the curve 52 of Fig. 8.

In the third master switch position, the switches 62 and 72 are open and the switches 64 and 75 are closed to connect the condenser 61 into the primary circuit and the pair of condensers 70 into the secondary circuit, respectively. Since the condenser 61 is preferably of larger capacity than the condenser 60, the speed-torque characteristic of the motor is now given by the curve 53 of Fig. 8 which indicates that in the third position the lower speeds for all loads are increased. The ohmic value of the resistors 26 may be changed in any suitable manner each time a different pair of the condensers 66, 68 and 70 is inserted into the secondary circuit if found desirable.

Lowering by normal polyphase motor action is provided in the fourth position by closure of the switches 55, 56, 57 and 76 as indicated in Fig. 11. Further speed control during polyphase lowering can be obtained by adjusting the value of the resistors 26 as is well known in the art.

I claim:

1. A braking control system for an alternating current motor of the induction type having distributed and inductively related primary and secondary windings and being subject to an overhauling load, a secondary circuit, means for connecting the secondary winding in said secondary circuit, means for connecting the primary winding in a dynamic braking circuit and to a source of alternating current to produce in said motor the phenomenon considered as two oppositely rotating magnetic fields the strengths of which are independent of motor speed, whereby during rotation of said motor by said overhauling load currents of different frequency ranges flow concurrently in said secondary circuit, and means electrically associated with said secondary circuit and operable upon rotation of the motor when driven by said overhauling load at speeds below synchronism to cause a rapid increase with speed of the torque produced by currents in one of said frequency ranges.

2. A braking control system for an alternating current motor of the induction type having distributed and inductively related primary and secondary windings, a secondary circuit, means for connecting the secondary winding in said secondary circuit, means for connecting the primary winding in a dynamic braking circuit and to a source of alternating current to produce in said motor the phenomenon considered as two oppositely rotating magnetic fields the strengths of which are substantially independent of motor speed, whereby currents of two different frequency ranges flow concurrently in said secondary circuit upon rotation of said motor, and a capacitive reactance means connected in said secondary circuit and operable upon rotation of said motor and in cooperation with said secondary winding for increasing the torque producing ability of currents in the higher one of said frequency ranges and for decreasing the torque producing ability of currents in the lower one of said frequency ranges.

3. A braking control system for an alternating current motor of the induction type having distributed and inductively related primary and secondary windings, a secondary circuit constituting a polyphase network having a plurality of branches, means for connecting the secondary winding in said secondary circuit, means for connecting the primary winding in a dynamic braking circuit and to a source of alternating current to produce in said motor the phenomenon considered as two oppositely rotating magnetic fields the strengths of which are substantially independent of motor speed, whereby currents of two different frequency ranges flow concurrently in said secondary circuit upon rotation of said motor, a capacitive reactance means connected in said secondary circuit and operable in cooperation with said secondary winding for causing said secondary circuit to be resonant at a frequency above the lower frequency range and within the higher frequency range, and said capacitive reactance means being so distributed in the branches of said secondary circuit that said secondary circuit is unbalanced.

4. A braking control system in accordance with claim 1 characterized in that the last named means comprises an electrical network tuned to offer low impedance to currents in the higher of said frequency ranges and high impedance to currents in the lower of said frequency ranges.

5. A braking control system in accordance with claim 1 characterized in that the last named means comprises a series resonant circuit tuned to render the power factor of the currents in the higher of said frequency ranges substantially unity throughout a portion of the said higher of said frequency ranges.

6. The combination with an induction motor comprising a primary winding and a polyphase secondary winding which is connected in a secondary circuit having a plurality of branches, of capacitive reactance means connected in less than all of said branches to alter the effective reactance of said motor.

7. The combination with a polyphase induction motor having a primary winding and a secondary winding which is connected in a secondary circuit, and means for connecting the primary winding to a source of alternating current, of capacitive reactance means and inductive reactance means interposed in said secondary circuit, the total inductive reactance and the total capacitive reactance of said secondary circuit being so related that said secondary circuit is series resonant at a frequency above the frequency of said source.

8. A braking control system for an alternating current motor of the induction type having distributed and inductively related primary and secondary windings, a secondary circuit, means for connecting the secondary winding in said secondary circuit, means for connecting the primary winding to a source of power thereby to produce in said motor the phenomenon considered as oppositely rotating magnetic fields the strengths of which are independent of motor speed, whereby during rotation of said motor currents of different frequency ranges flow in said secondary circuit, a condenser, means for concurrently connecting a portion of said primary winding which is angularly disposed with respect to an excited portion of said primary winding in a local closed circuit with said condenser, said condenser being effective when connected in said closed circuit to alter the phase relationship of currents flowing in said motor, and means electrically associated with said secondary circuit and operable upon rotation of said motor and in cooperation with said secondary winding for causing said secondary circuit to be substantially resonant within the higher of said frequency ranges.

9. A braking control system for an alternating current motor of the induction type having distributed and inductively related primary and secondary windings, a secondary circuit, means for connecting the secondary winding in said secondary circuit, means for connecting the primary winding to a source of power thereby to produce in said motor the phenomenon considered as oppositely rotating magnetic fields the strengths of which are independent of motor speed, whereby during rotation of said motor currents of different frequency ranges flow in said secondary circuit, a condenser, means for concurrently connecting a portion of said primary winding which is angularly disposed with respect to an excited portion of said primary winding in a local closed circuit with said condenser, said condenser being effective when connected in said closed circuit to alter the phase relationship of currents flowing in said motor, and a condenser means electrically associated with said secondary circuit and operable upon rotation of said motor and in cooperation with said secondary winding for causing said secondary circuit to be substantially resonant within the higher of said frequency ranges.

10. A braking control system for an alternating current motor of the induction type having distributed and inductively related primary and secondary windings, a secondary circuit having a plurality of branches, means for connecting the secondary winding in said secondary circuit, means for connecting the primary winding to a source of power thereby to produce in said motor the phenomenon considered as oppositely rotating magnetic fields the strengths of which are independent of motor speed, whereby during rotation of said motor currents of different frequency ranges flow in said secondary circuit, a condenser, means for concurrently connecting a portion of said primary winding which is angularly disposed with respect to an excited portion of said primary winding in a local closed circuit with said condenser, said condenser being effective when connected in said closed circuit to alter the phase relationship of currents flowing in said motor, and means connected in less than all of the branches of said secondary circuit and operable upon rotation of said motor and in cooperation with said secondary winding for causing said secondary circuit to be substantially resonant within the higher of said frequency ranges.

11. A braking control system for a three-phase induction motor having distributed and inductively related primary and secondary windings, said primary winding having three non-neutral terminals, a condenser, means for connecting said condenser between two of said primary terminals, means for concurrently connecting one of said two terminals and the third terminal across a source of single phase power, and means operable while said primary winding is so connected to connect said secondary winding in a closed circuit including capacitive reactive means, whereby said motor exerts a motor torque at slow speeds and a braking torque at higher speeds under synchronism.

12. A braking control system for a three-phase induction motor having distributed and inductively related primary and secondary windings, said primary winding having three non-neutral terminals, a condenser, means for connecting said condenser between two of said primary terminals, means for concurrently connecting one of said two terminals and the third terminal across a source of single phase power, capacitive reactance means, and means operable while said primary winding is so connected to connect said secondary winding in an unbalanced closed polyphase network including said capacitive reactive means, the impedance of said condenser and of said polyphase network being so related to each other and to the impedance of said motor that said motor exerts a motor torque at slow speeds and a braking torque at higher speeds under synchronism.

13. The method of electrically braking a rotating polyphase induction motor driven by an overhauling load and having a primary winding and a secondary winding, which method comprises connecting the primary winding to a source of power so that unbalanced polyphase currents flow in said primary winding thereby to produce the effect of oppositely rotating fields in said motor, and, while said primary winding is so excited, connecting said secondary winding in a closed series resonant circuit capable of resonating at two different frequencies within the higher of the two different frequency ranges of the currents flowing in said secondary winding as a result of rotation of said motor when excited to produce oppositely rotating fields.

14. The method of electrically braking a rotating polyphase induction motor driven by an overhauling load and having a primary winding and a secondary winding, which method comprises connecting the primary winding to a source of power so that unbalanced polyphase currents flow in said primary winding thereby to produce the effect of oppositely rotating fields in said motor, and, while said primary winding is so excited, connecting said secondary winding in a closed circuit, whereby said oppositely rotating fields cause currents of two different frequency ranges to flow in said secondary winding, introducing capacitive reactance in said secondary circuit to augment the torque producing ability of currents in the higher of said frequency ranges, and subsequently reducing the capacity of said capacitive reactance means thereby to reduce the braking torque of said motor and to cause said overhauling load to drive said motor at a more rapid speed.

HAROLD J. RATHBUN.

REFERENCES CITED

The following references are of record in the file of this patent:

UNITED STATES PATENTS

| Number | Name | Date |
|---|---|---|
| 1,598,192 | Seymour et al. | Aug. 31, 1926 |
| 2,325,413 | McArthur et al. | July 27, 1943 |
| 2,325,454 | Wilcox | July 27, 1943 |
| 2,233,501 | Wilcox | Mar. 4, 1941 |
| 1,304,294 | Fortescue | May 20, 1919 |
| 911,147 | Mershon | Feb. 2, 1909 |
| 1,866,349 | Green | July 5, 1932 |
| 2,310,713 | Shoults et al. | Feb. 9, 1943 |
| 2,175,935 | West | Oct. 10, 1939 |

FOREIGN PATENTS

| Number | Country | Date |
|---|---|---|
| 109,348 | Austrian | Apr. 10, 1928 |
| 453,862 | British | Sept. 21, 1936 |
| 13,709 | British | of 1914 |
| 487,695 | British | June 24, 1938 |

OTHER REFERENCES

"Single Phase Braking of Three-Phase Induction Motors," A. van Niekerk, The Electrical Journal, February, 1936, pages 101–105, inclusive.